W. M. WHITE.
SPIRAL REGAINER.
APPLICATION FILED OCT. 29, 1913. RENEWED DEC. 3, 1915.

1,273,559.

Patented July 23, 1918.
3 SHEETS—SHEET 1.

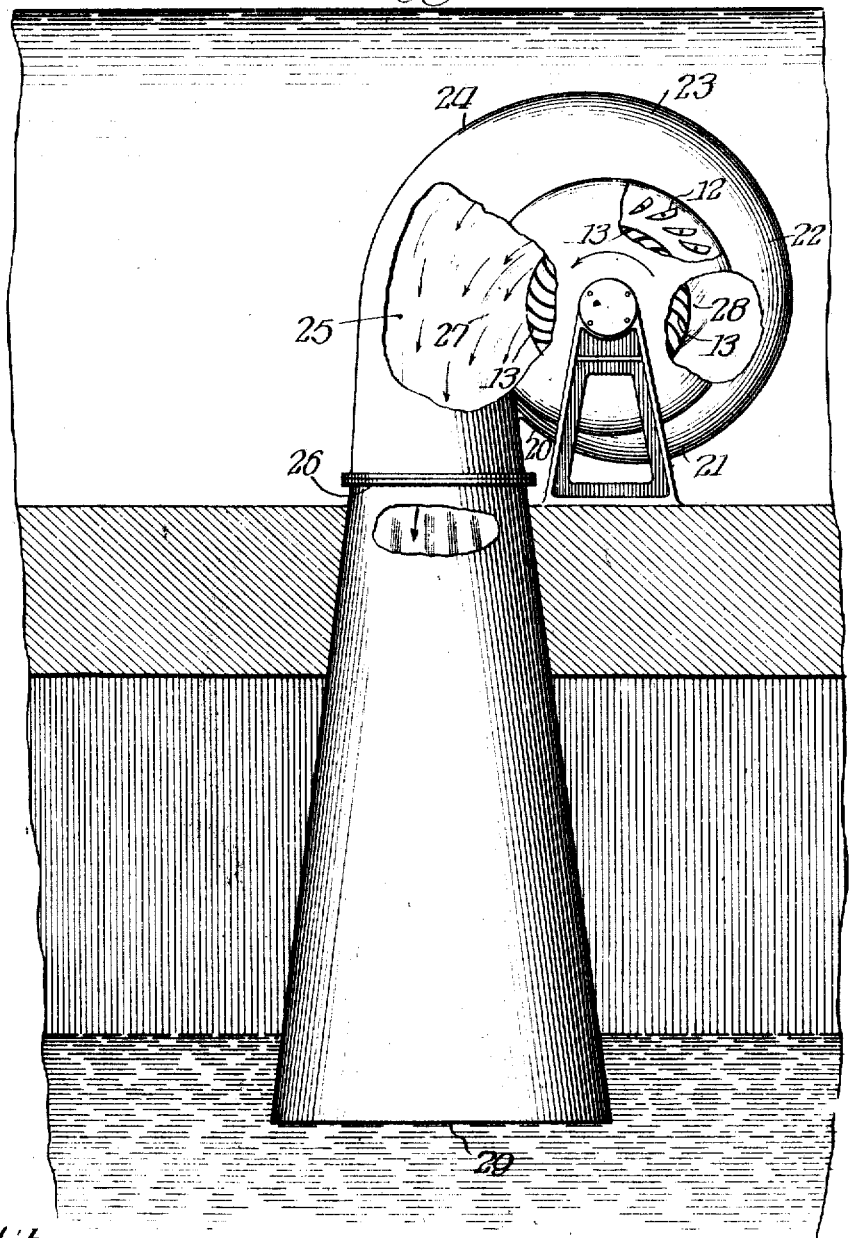

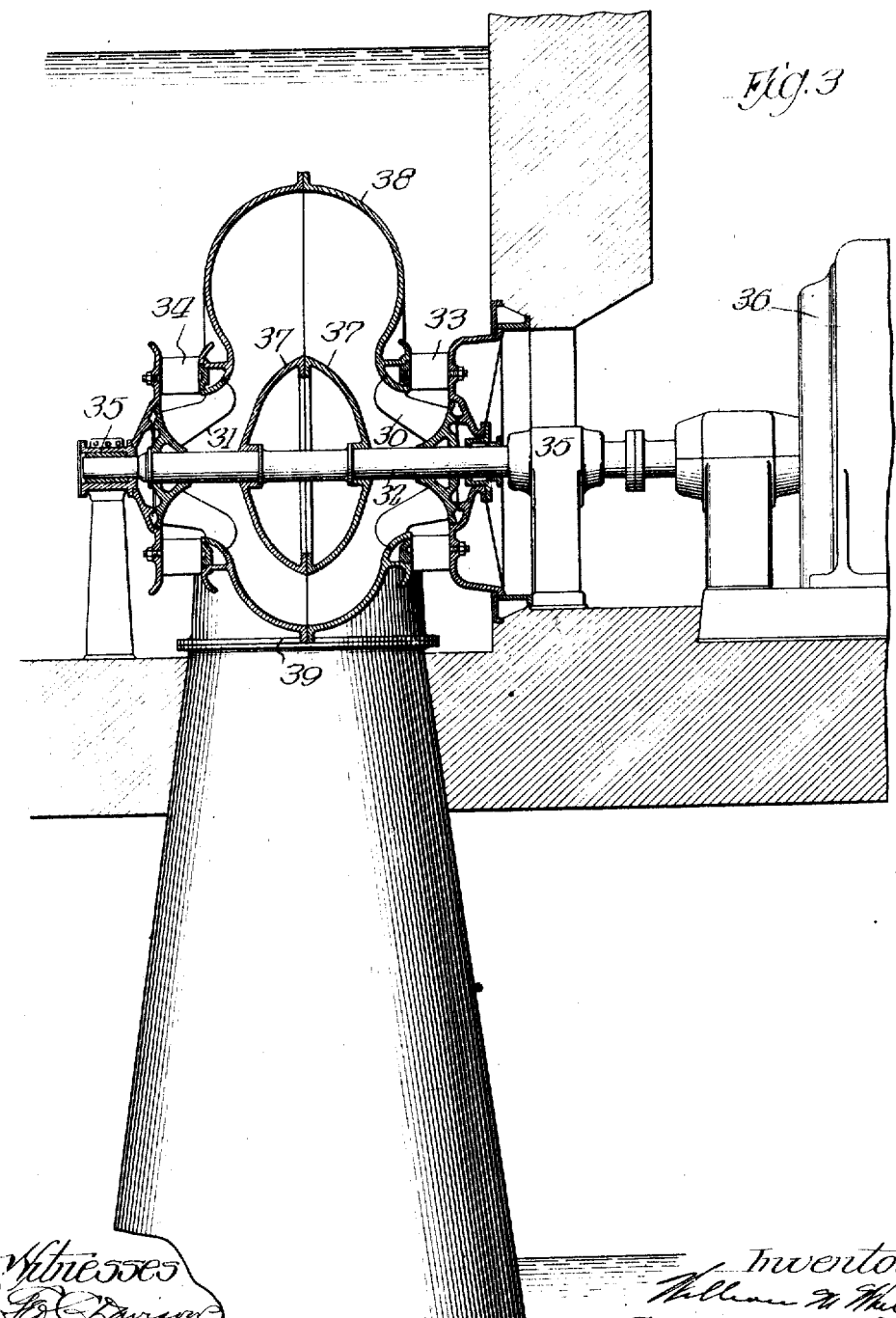

UNITED STATES PATENT OFFICE.

WILLIAM M. WHITE, OF MILWAUKEE, WISCONSIN.

SPIRAL REGAINER.

1,273,559.      Specification of Letters Patent.      Patented July 23, 1918.

Application filed October 29, 1913, Serial No. 797,952. Renewed December 3, 1915. Serial No. 64,936.

*To all whom it may concern:*

Be it known that I, WILLIAM M. WHITE, a citizen of the United States, and resident of Milwaukee, in the county of Milwaukee and State of Wisconsin, have invented certain new and useful Improvements in Spiral Regainers, of which the following is a specification.

My invention relates to improvements in water power plants, and more particularly to the regaining of energy for useful work from the water after it leaves the water wheel runner.

In the usual power plant the water flowing from the runner of the water wheel is conveyed to the tail race by means of a cylindrical pipe called a draft tube. For water wheels with horizontal shafts an elbow is usually employed to collect the water from the water wheel and deliver it to the draft tube. This elbow offers considerable resistance to the flow of the water and causes a loss of energy.

A water wheel runner includes vanes to form passages for the water. The vanes are shaped and disposed in such manner that water is discharged from the runner in a direction opposite to that of the rotation of the runner. Water is admitted to the runner by guide vanes usually pivoted and adjustable. In order to obtain greatest efficiency in the present art, the water flowing from the runner must contain the least possible energy. The openings between the guide vanes and runner vanes at rated load are so related that the backward discharge from the runner vanes about equals the forward rotation of the runner so that the water flows out axially; that is, without appreciable rotation or whirl, consequently the water flows through the draft tube in approximately parallel axial stream lines. By reason of this parallel equal flow, the draft tube transforms the energy from velocity into pressure with best effect, giving conditions for maximum efficiency on the water wheel.

The design of a water wheel runner is, of necessity, such that the water flows from it with considerable velocity which contains in some instances as much as twenty per cent. of the total energy of the fall.

In order to obtain the greatest efficiency it is important to regain the greatest amount of this energy by transforming it into head for useful effect on the water wheel runner.

When the water wheel is operated at part load the relation between the openings of the guide vanes and runner vanes is such that the water discharged from the runner is rotating in the same direction as the runner, and the water flows out in a whirling or spiral motion. This whirling becomes so great at low loads that the energy contained in it is greater than the energy discharged from the runner when the water wheel is operated at full load. Further, when the water wheel is operated at a speed greater than that for best efficiency at full load, its efficiency is decreased largely because of this whirling action. The whirling water presses against the draft tube walls and, being confined, the outer portion flows around and down the tube with such great velocity that the center portion of the water in the draft tube is sucked up to the runner and then thrown out along and sometimes through the runner vanes. The greater portion of the excess energy in the water is consumed in these eddies and whirls. In my co-pending applications Serial Nos. 769,790 and 769,791, filed May 26, 1913, I have provided other means of regaining the energy in the discharged water and transforming it into head for useful effect in the water wheel runner.

I now locate about the water wheel runner a rectifier to convert rotary motion of water flowing from the runner into tangential and parallel flow, and discharge this parallel flow into a draft tube or expanding channel in which the energy in velocity may be efficiently transformed into head.

The rectifier consists of a form of spiral casing progressively increasing in transverse area to accommodate the additional flow into it, the plane of the casing being located at right angles to the axis of rotation of the runner. The area of the spiral is such that the velocity of the water around it is maintained at approximately the same velocity as the whirling water flowing from the runner. By reason of the velocities being approximately the same and in approximately the same direction, the eddies, whirls and shocks are reduced to a minimum, and the stream flow is maintained in condition for the greatest amount of energy transformation from velocity into pressure in the draft tube.

I thus provide means for increasing the effective head on a water wheel without necessarily making use of centrifugal force, and without passages of expanding area except the usual draft tube.

My invention will be more readily understood by reference to the accompanying drawings, wherein:

Fig. 2 is a transverse vertical part section, and,

Fig. 3 is a longitudinal vertical section of a typical horizontal two runner water wheel and rectifier.

Figure 1:
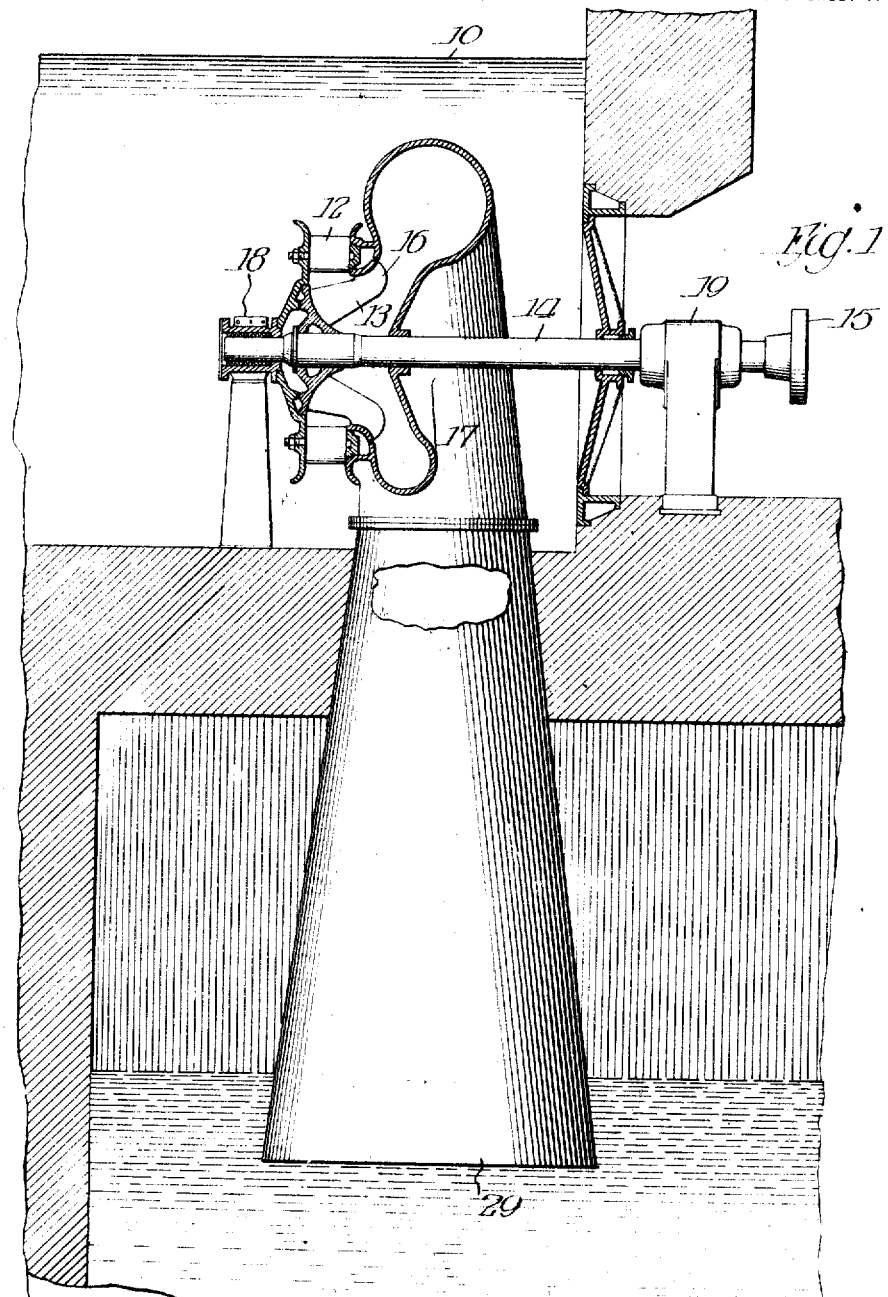
Figure 1 is a longitudinal vertical section of a typical horizontal water wheel and rectifier.

Referring more particularly to Fig. 1, it will be seen that the water wheel is located in an open pit with the level of the water above the water wheel indicated at 10, and that the draft tube from the rectifier extends below the surface of the tail water indicated at 11.

The guide vanes 12, direct and control the water to the runner 13. The runner discharges at 16, into the rectifier 17. A shaft 14, transmits the power of the runner 13 to the coupling 15. The shaft is supported in two bearings 18, 19.

By reference to Fig. 2 it will be noted that the rectifier increases in area from 20, 21, 22, 23, 24 to 25, and connects to the upper end of a draft tube at 26. For conditions of overspeed or part load the water leaves the runner in a whirling motion as indicated by stream lines at 27. The area of the casing at 21, 22, 23, etc., is made such that a velocity is maintained with which the velocity at 28 may be combined with least disturbance, shock and consequently least loss of energy. This will be obtained when the velocity in the casing is approximately equal to the velocity of the whirling water from the runner. The increase of area of the rectifier from 20 to 21, etc., is such as to accommodate the increment of flow from the runner and such that the velocity is maintained the same from 20 to 25. By reason of the increasing area around the periphery approximately parallel stream lines are obtained in the water and the change from rotary motion to tangential flow is made without great loss of energy. The flow at 26 is approximately parallel and of approximately equal velocities and contains energy in the form of velocity. The rectifier discharges into an expanding tube at 26, in which the energy in velocity is transformed into pressure at 29, for producing in part the effective head on the wheel. In this way the energy of the whirling water which is discharged by the runner when it is operated at overspeed on part load is conserved and used to increase the power, speed and efficiency of the water wheel.

In order to produce great power for a given speed under an available fall, it is sometimes necessary to mount two or more runners upon one shaft. The usual method of mounting two runners upon one shaft is shown in Fig. 3, where the runners discharge toward each other. In the construction commonly used the two runners discharge into a draft chest consisting essentially of two elbows leading the water from the runners into one channel. In Fig. 3 I have shown two runners discharging into one rectifier. In this construction two runners 30, 31, are mounted on a common shaft 32, the water being admitted to the runners through the guide vanes 33, 34. The shaft 32, is mounted in bearings 35, and is suitably connected to a generator 36. Deflector plates 37 are located at the discharge of each runner which guide the water to the rectifier. A spiral casing or rectifier 38, surrounds the two runners, this casing being similar to that shown in Fig. 2.

The flow from the runners 30, 31, is about the same as that maintained in the casing 38, and the direction is also approximately the same, so that these flows join together with least shock and loss of energy. In this way whirling water from the two runners is changed from rotary motion to tangential flow. The rectifier is joined at 39, to a draft tube of expanding area in which the velocity is transformed into pressure to produce in part the effective head on the wheel, and thus the water wheel may be operated at greater speeds, since the energy escaping from the wheel is made use of sufficiently to produce a part of the head acting on the runner to the end that the power and speed of the wheel is greatly increased.

It is obvious that the water wheel shaft may be placed in a vertical position and the plane of the spiral regainer would then be horizontal. In this position it may or may not be advisable to add the expanding pipe to the end of the spiral. The device will work with fairly good effect without this addition of the expanding pipe.

It is obvious that the constructions shown are only typical and may be modified in many ways to suit varying conditions of speed, head and location. Such modifications as are within the scope of my claims I consider within the spirit of my invention.

I claim:

1. In a water power plant, the combination of a water wheel having a discharge passage, a deflector located in said passage, walls surrounding said passage, said walls defining a space progressively increasing in area around the periphery of the wheel, and a draft tube communicating with said passage, substantially as described.

2. In a water power plant, the combination of a water wheel associated with a discharge space, a deflector located in said space, walls surrounding said space, said walls providing a spiral conduit the cross sectional area of said conduit progressively increasing whereby the flow of water from the water wheel may be changed from rotary and axial to radial and tangential, and a conical draft tube communicating with said spiral conduit, substantially as described.

3. In a water power plant, the combination of a water wheel runner adapted to discharge water therefrom with a rotary flow, a spiral casing surrounding the rotative axis of said runner, and a flared draft tube communicating with said spiral tube, substantially as described.

4. In a water wheel construction, the combination of a water wheel runner and a spiral collector located about the axis of said runner and adapted to receive water therefrom, substantially as described.

5. In a water power plant, the combination of a water wheel having a discharge passage, a deflector located in said passage, and walls surrounding said passage, said walls defining a space progressively increasing in area around the periphery of the wheel, substantially as described.

6. In water power apparatus, the combination of a casing and a pair of runners discharging into opposite sides thereof, said casing being formed as a spiral whereby energy in the discharged water in the form of velocity may be changed into pressure, substantially as described.

7. In a device of the class described, the combination of two water wheels mounted in opposed relation, a conical deflector located at the outlet of each water wheel and a single spiral casing into which the water from both said wheels is discharged, substantially as described.

8. In a device of the class described, the combination of a spiral tube, a water wheel mounted at each side of said tube, and a deflecting plate in said tube mounted in such position with relation to the axis of the said wheels as to deflect the water discharged from said wheels into said spiral tube with maximum efficiency, substantially as described.

9. In a device of the class described, the combination of a pair of axially alined water wheels, a deflecting plate located at the discharge of both said wheels, and a single spiral draft tube into which the water discharged from said water wheels against said plate is accommodated, substantially as described.

10. The combination with a fluid motor, of a discharge passage or draft tube of spiral form increasing in cross section in the direction of the outflow therethrough.

11. The combination with a fluid motor, of a discharge passage or draft tube of spiral form increasing in cross section in the direction of the outflow therethrough terminating in a tangent portion.

12. The combination with a fluid motor imparting a whirl to the discharging fluid, of a gradually expanding spiral discharge passage therefor adapted to guide the discharging fluid in the direction of the whirl.

13. The combination with a fluid motor having a rotary runner, of a spiral draft tube therefor having an annular opening to receive the water discharged from the runner.

14. The combination with a fluid motor, of a spiral draft tube therefor having an annular opening to receive the outflow from the motor, and a closed tube receiving the outflow from said draft tube.

15. The combination with a fluid motor having an axial discharge, of a spiral draft tube therefor and a discharge passage receiving the outflow from said draft tube.

16. The combination with a fluid motor having an axial discharge, of a draft tube therefor guiding the discharged fluid away from the axis and having a central core extending into proximity to said motor, and a spiral surface connecting the outer wall and the core.

17. The combination with a fluid motor having an axial discharge, of a spiral draft tube therefor guiding the discharging fluid away from the axis and having a central core extending into proximity with said motor.

18. The combination with a fluid motor having an axial discharge, of a spiral draft tube therefor guiding the discharging fluid away from the axis and having a central core having a surface of revolution extending into proximity with said motor.

19. The combination with a fluid motor having an axial discharge, of a spiral flaring draft tube therefor guiding the discharging fluid away from the axis and having a central core extending into proximity with said motor.

20. The combination with a fluid motor, of a discharge passage or draft tube therefor having a spiral form, the inner surface of which extends to a point in proximity to the motor.

21. The combination with a fluid motor having an axial discharge, of a draft tube therefor having a central core extending into proximity to the motor, and a spiral surface connecting the outer wall and the core.

22. The combination with a fluid motor having an axial discharge, of a spiral flaring draft tube therefor having a central core extending into proximity with the motor.

23. The combination with a hydraulic turbine having a runner of the inward and downward flow type, of a spiral draft tube developing radially and axially with respect to the runner to guide the outflow therefrom and increasing in cross-section in the direction of travel of the discharging water.

24. The combination with a fluid motor of the inward flow type, of a draft tube therefor guiding the discharged fluid away from the axis and having a central core extending into proximity to said motor, and at least one spiral surface connecting the outer wall and the core.

25. The combination with a fluid motor of the inward and downward flow type, of a draft tube therefor guiding the discharged fluid away from the axis and having a central core extending into proximity to said motor, and at least one spiral surface connecting the outer wall and the core.

26. The combination with a fluid motor of the inward flow type, of a draft tube therefor having a central core extending into proximity to the motor, and a spiral surface connecting the outer wall and the core.

27. The combination with a fluid motor of the inward and downward flow type, of a draft tube therefor having a central core extending into proximity to the motor, and a spiral surface connecting the outer wall and the core.

WILLIAM M. WHITE.

Witnesses:
CHAS. F. MURRAY,
T. D. BUTLER.